Feb. 6, 1940.   H. MULCH   2,188,954
PROJECTION APPARATUS
Filed Oct. 27, 1937
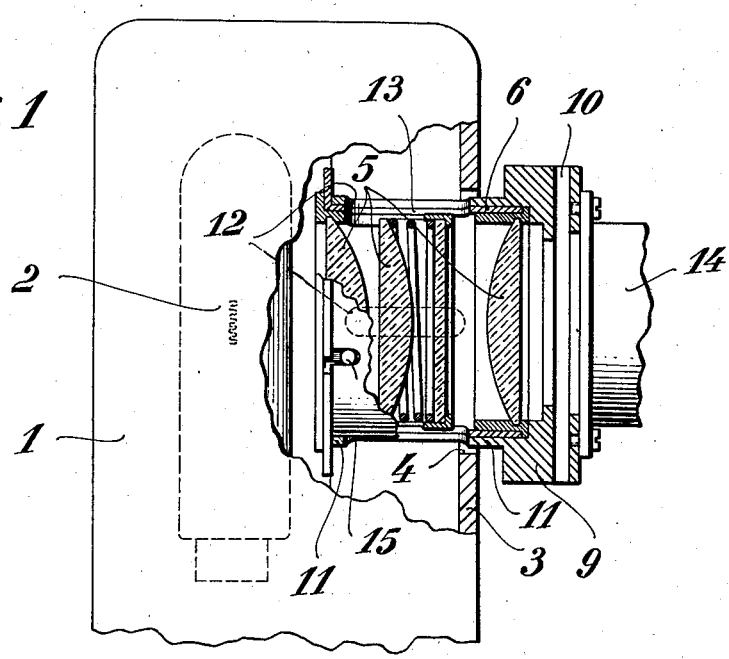
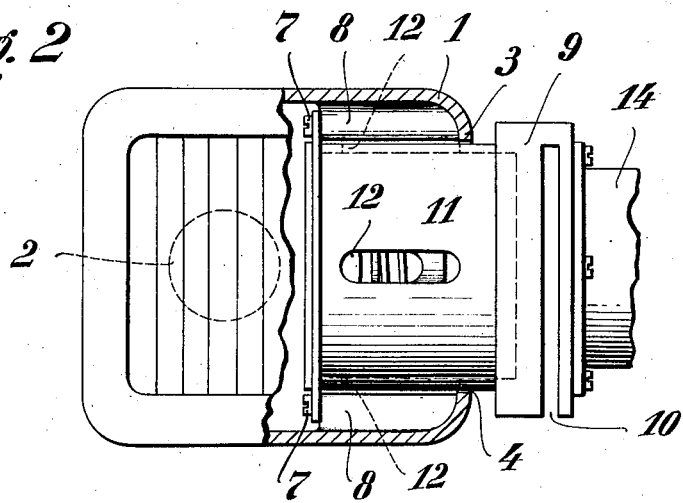
INVENTOR
Hans Mulch
BY
ATTORNEY Patented Feb. 6, 1940

2,188,954

UNITED STATES PATENT OFFICE 2,188,954

PROJECTION APPARATUS

Hans Mulch, Wetzlar-Niedergirmes, Germany, assignor to Ernst Leitz, G. m. b. H., Wetzlar, Germany Application October 27, 1937, Serial No. 171,183
In Germany December 4, 1936

3 Claims. (Cl. 88—24)

This invention relates to picture projection apparatus and its object is to provide a small inexpensive apparatus for projecting purposes. The invention is embodied in an apparatus constructed and arranged as hereinafter set forth and which includes certain novel features relating to the support and mounting of the condenser lens elements which in turn serve to support the picture slide frame and the objective carrier. These latter elements are rotatably carried by the condenser housing.

In the accompanying drawing illustrating the invention—

Fig. 1 is a view of the projection apparatus partly broken away and in section to show the arrangement of the condenser elements, the slide frame and the objective.

Fig. 2 is a top view also partly broken away and partly in section.

The reference numeral 1 denotes the general housing of the projection apparatus which rests upon a supporting base, not shown. The housing supports an electric lamp 2 by any usual means not particularly indicated. The front wall 3 has an aperture 4 through which the condenser unit, picture frame and objective are mounted and operated.

The condenser unit includes the lenses 5 which are held in proper optically spaced relation in a mounting 6. The latter may be secured to the housing 1 by screws 7 which pass into supporting lugs 8.

The picture frame 9 has the usual slit 10 for inserting the picture slides. The frame is rotatably and slidably carried by the condenser mounting 6 by means of a tubular extension 11. The latter has four ventilating openings 12 adapted to register with two ventilating openings 13 in the condenser mounting 6 so that when the outer picture frame tube 11 is rotated ninety degrees to display the pictures vertically or horizontally, two of the openings 12 will always register with the two openings 13 to provide ventilation as will be understood. The objective 14 is secured to the picture frame as shown. When the latter is rotated to display the pictures vertically or horizontally it is held temporarily immovable by a spring catch 15 as shown and as will be understood.

It will be seen therefore, that the construction is such that the greater portion of the condenser unit is located within the housing which makes for compactness. That the picture frame and objective are rotatably and slidably carried by the condenser unit for proper display and focusing purposes and that no additional elements, such as is found in prior structures for such purposes, are required in the present invention.

The projection apparatus disclosed embodies the utmost simplicity and compactness and may be manufactured at low costs.

I claim:

1. A projection apparatus of the character described comprising a housing, a lamp in said housing, a condenser lens unit, a mounting in which said unit is supported, means for securing the said mounting to the said housing with the greater portion of the mounting within the housing, a picture frame support, an objective secured to the front portion thereof, a tubular rear extension on said support enclosing and slidably and rotatably mounted upon said condenser lens unit mounting for rotatably positioning said picture frame support in one of two predetermined picture projecting positions ninety degrees apart, means for maintaining said support in either one of said projecting positions, the greater portion of the said mounting and tubular extension being contained within the housing to provide a compact small projection apparatus.

2. A projection apparatus of the character described comprising a housing having a projection aperture in the front wall thereof, a lamp in said housing, a condenser lens unit, a mounting in which said unit is supported, fastening lugs in the housing spaced a substantial distance from the said front wall, means for securing the said mounting to the said lugs, a picture frame support, an objective secured thereto in front of said support, a rear tubular extension on said support enclosing the said mounting and directly rotatably and slidably carried thereby for rotatably positioning said picture frame support in one of two predetermined picture projecting positions ninety degrees apart, means for maintaining said support in either one of said projecting positions, the greater portion of said condenser lens unit and picture frame support being within said housing behind the front wall thereof, said picture frame support and objective being immediately in front of said front wall.

3. A projection apparatus according to claim 2 including ventilating openings in the condenser lens unit mounting and in the tubular rear extension of the picture frame support.

HANS MULCH.